(12) United States Patent
Tiu, Jr. et al.

(10) Patent No.: US 10,353,915 B2
(45) Date of Patent: *Jul. 16, 2019

(54) CUSTOMIZING TRACKING CHANGES TO USER CONTENT IN AN ONLINE SOCIAL NETWORK

(75) Inventors: William K. Tiu, Jr., San Francisco, CA (US); Kent Lindstrom, San Francisco, CA (US); Ross Ainsley MacKinnon, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/312,823

(22) Filed: Dec. 6, 2011

(65) Prior Publication Data

US 2012/0079025 A1    Mar. 29, 2012

Related U.S. Application Data

(63) Continuation of application No. 13/269,307, filed on Oct. 7, 2011, which is a continuation of application No. 11/624,088, filed on Jan. 17, 2007, now Pat. No. 8,037,093, which is a continuation-in-part of application No. 11/531,154, filed on Sep. 12, 2006.

(51) Int. Cl.
| | |
|---|---|
| *G06F 7/00* | (2006.01) |
| *G06F 16/25* | (2019.01) |
| *G06F 16/954* | (2019.01) |
| *G06F 16/957* | (2019.01) |
| *G06F 21/62* | (2013.01) |
| *G06F 16/338* | (2019.01) |
| *G06F 16/951* | (2019.01) |
| *G06F 8/65* | (2018.01) |

(52) U.S. Cl.
CPC .......... *G06F 16/258* (2019.01); *G06F 16/954* (2019.01); *G06F 16/957* (2019.01); *G06F 8/65* (2013.01); *G06F 16/338* (2019.01); *G06F 16/951* (2019.01); *G06F 21/6227* (2013.01)

(58) Field of Classification Search
CPC ...................................................... G06F 8/65
USPC .................................... 707/999.101, 999.102
See application file for complete search history.

(56) References Cited

U.S. PATENT DOCUMENTS

| | | |
|---|---|---|
| 5,572,643 A | 11/1996 | Judson |
| 6,324,541 B1 | 11/2001 | de l'Etraz |
| 6,879,965 B2 | 4/2005 | Fung |
| 7,023,979 B1 * | 4/2006 | Wu ..................... H04M 3/5233 379/265.11 |
| 7,031,961 B2 | 4/2006 | Pitkow |
| 7,231,176 B2 | 6/2007 | Levy |
| 7,249,123 B2 | 7/2007 | Elder |

(Continued)

OTHER PUBLICATIONS

U.S. Appl. No. 14/491,361, filed Sep. 19, 2014, Tiu.

(Continued)

*Primary Examiner* — Eliyah S. Harper
(74) *Attorney, Agent, or Firm* — Baker Botts L.LP.

(57) ABSTRACT

Updates to landing pages of users in an online social network are fed from external sources so that content maintained by any one user can be consolidated in a single location regardless of where the changes are made to the content. When an update event occurs, users of the online social network are notified according to various criteria that they have set. With this feature, users can browse through content of other users efficiently.

19 Claims, 9 Drawing Sheets

(56) References Cited

U.S. PATENT DOCUMENTS

| | | |
|---|---|---|
| 7,359,894 B1 | 4/2008 | Liebman |
| 7,433,876 B2 | 10/2008 | Spivack |
| 7,539,697 B1* | 5/2009 | Akella .................... H04L 51/32 |
| 7,596,597 B2 | 9/2009 | Liu |
| 7,613,769 B1 | 11/2009 | Hess |
| 7,669,123 B2 | 2/2010 | Zuckerberg |
| 7,676,034 B1* | 3/2010 | Wu .................... H04M 3/5233 379/265.01 |
| 7,730,143 B1 | 6/2010 | Appelman |
| 7,797,732 B2 | 9/2010 | Tam |
| 7,831,658 B2 | 11/2010 | Khopkar |
| 7,832,003 B2 | 11/2010 | Kelly |
| 7,881,969 B2 | 2/2011 | Wiseman |
| 7,991,764 B2 | 8/2011 | Rathod |
| 8,037,093 B2 | 10/2011 | Tiu, Jr. |
| 8,166,069 B2 | 4/2012 | Sample |
| 8,171,128 B2 | 5/2012 | Zuckerberg |
| 8,190,724 B2 | 5/2012 | Norton |
| 8,682,995 B1 | 3/2014 | Lawler |
| 8,694,542 B2 | 4/2014 | Tiu |
| 9,479,474 B2 | 10/2016 | Norton |
| 2002/0016786 A1 | 2/2002 | Pitkow |
| 2003/0018719 A1 | 1/2003 | Ruths |
| 2003/0158855 A1 | 8/2003 | Farnham |
| 2004/0044566 A1 | 3/2004 | Bostelmann |
| 2004/0060129 A1 | 4/2004 | Juett |
| 2004/0088325 A1 | 5/2004 | Elder |
| 2005/0060417 A1 | 3/2005 | Rose |
| 2005/0193010 A1 | 9/2005 | DeShan |
| 2005/0198299 A1 | 9/2005 | Beck |
| 2005/0203801 A1 | 9/2005 | Morgenstern |
| 2005/0216300 A1 | 9/2005 | Appelman |
| 2005/0256866 A1 | 11/2005 | Lu |
| 2005/0283497 A1* | 12/2005 | Nurminen .............. G06Q 10/10 |
| 2005/0283753 A1 | 12/2005 | Ho |
| 2006/0015540 A1 | 1/2006 | Takeda |
| 2006/0047419 A1 | 3/2006 | Diendorf |
| 2006/0048059 A1 | 3/2006 | Etkin |
| 2006/0085370 A1 | 4/2006 | Groat |
| 2006/0085419 A1 | 4/2006 | Rosen |
| 2006/0117378 A1 | 6/2006 | Tam |
| 2006/0136419 A1 | 6/2006 | Brydon |
| 2006/0173841 A1 | 8/2006 | Bill |
| 2006/0230061 A1 | 10/2006 | Sample |
| 2006/0240856 A1 | 10/2006 | Counts |
| 2006/0259957 A1 | 11/2006 | Tam |
| 2007/0005754 A1 | 1/2007 | Horvitz |
| 2007/0011665 A1 | 1/2007 | Gandhi |
| 2007/0038712 A1 | 2/2007 | Affronti |
| 2007/0043688 A1* | 2/2007 | Kountz ................. G06F 17/241 |
| 2007/0050446 A1* | 3/2007 | Moore ...................... G06F 8/36 709/203 |
| 2007/0060129 A1 | 3/2007 | Ramer |
| 2007/0094389 A1 | 4/2007 | Nussey |
| 2007/0100960 A1 | 5/2007 | Eichstaedt |
| 2007/0106627 A1 | 5/2007 | Srivastava |
| 2007/0136178 A1 | 6/2007 | Wiseman |
| 2007/0162432 A1 | 7/2007 | Armstrong |
| 2007/0171716 A1 | 7/2007 | Wright |
| 2007/0174247 A1* | 7/2007 | Xu .................... G06F 17/30722 |
| 2007/0220010 A1 | 9/2007 | Ertugrul |
| 2007/0239538 A1 | 10/2007 | Misra |
| 2007/0255785 A1* | 11/2007 | Hayashi ................ H04L 67/104 709/204 |
| 2007/0266003 A1* | 11/2007 | Wong .................... G06Q 90/00 |
| 2007/0282959 A1 | 12/2007 | Stern |
| 2007/0282980 A1* | 12/2007 | Fischer ................. G06Q 90/00 709/219 |
| 2008/0059576 A1 | 3/2008 | Liu |
| 2008/0065604 A1 | 3/2008 | Tiu |
| 2008/0065701 A1 | 3/2008 | Lindstrom |
| 2008/0091834 A1 | 4/2008 | Norton |
| 2008/0172288 A1 | 7/2008 | Pilskalns |
| 2008/0222060 A1 | 9/2008 | Perng |
| 2008/0228887 A1 | 9/2008 | Robertson |
| 2010/0030734 A1 | 2/2010 | Chunilal |
| 2012/0030286 A1 | 2/2012 | Tiu |
| 2012/0036191 A1 | 2/2012 | Tiu |
| 2012/0036213 A1 | 2/2012 | Tiu |
| 2012/0046260 A1 | 2/2012 | Lee-Sepsick |
| 2012/0079026 A1 | 3/2012 | Tiu |
| 2012/0084363 A1 | 4/2012 | Tiu |
| 2014/0164521 A1 | 6/2014 | Tiu |
| 2015/0012535 A1 | 1/2015 | Tiu |

OTHER PUBLICATIONS

U.S. Appl. No. 14/497,510, filed Sep. 26, 2014, Tiu.
U.S. Appl. No. 13/269,307, filed Oct. 7, 2011, William K. Tiu, Jr.
U.S. Appl. No. 13/277,032, filed Oct. 19, 2011, William K. Tiu, Jr.
U.S. Appl. No. 13/277,043, filed Oct. 19, 2011, William K. Tiu, Jr.
U.S. Appl. No. 13/312,895, filed Dec. 7, 2011, William K. Tiu, Jr.
U.S. Appl. No. 13/313,053, filed Oct. 19, 2011, William K. Tiu, Jr.
U.S. Appl. No. 13/313,915, filed Dec. 7, 2011, William K. Tiu, Jr.
Tiu, et al., "Feeding Updates to Landing Pages of Users of an Online Social Network from External Sources," Notice of Allowance from U.S. Appl. No. 11/624,088, dated Jun. 6, 2011.
Search Report for WO 2007/052285, dated May 10, 2007.
Submission of Prior Art Under 37 CFR1.501 for U.S. Pat. No. 8,037,093, Oct. 17, 2011.
Submission of Prior Art Under 37 CFR1.501 for U.S. Publication No. 2012/0030286, May 26, 2012.
Submission of Prior Art Under 37 CFR1.501 for U.S. Publication No. 2012/0036213, May 26, 2012.
Submission of Prior Art Under 37 CFR1.501 for U.S. Publication No. 2012/0036260, May 26, 2012.
U.S. Appl. No. 14/179,382, filed Feb. 12, 2014, William K. Tiu, Jr.
U.S. Appl. No. 13/313,823, filed Dec. 6, 2011, Tiu.
U.S. Appl. No. 13/313,895, filed Dec. 7, 2011, Tiu.
U.S. Appl. No. 13/313,915, filed Dec. 7, 2011, Tiu.
Boyd, Friendster and Publicly Articulated Social Networking, ACM CHI 2004, Apr. 24-29, 2004, pp. 1279-1282, Apr. 2004.
Lehman, Mathematics for Computer Science, 339 pages. (Year: 2004).
Barrett, et al., "If Smallpox Strikes Portland . . . ", Scientific American, Mar. 2005, pp. 54-61. (Year: 2005).

* cited by examiner

Friend Tracker Settings  410                                                    430

I would like to be notified of the following updates:

☐ Profile Changes
☐ New Photos
☐ New Friends/Members
☐ New Testimonials

I would like to be notified by:

☐ Home page
☐ E-mail
☐ RSS feed to another web site (specify)

440

Frequency of notification:

☐ As it happens
☐ Once per day
☐ Once per week

450

420 made to the content of the following users and/or groups:

☐ All 1st Degree Friends
☐ Select 1st Degree Friends (specify)
☐ Select Users (specify)
☐ Bookmarked Profiles (specify)
☐ Select Groups (specify)

☐ TURN OFF ALL NOTIFICATIONS

FIG. 4A

Friend Tracker

Latest Updates                                      More Friend Updates

Tammy
added new friend(s), last updated 9/7/2006

Sarah
received new testimonial(s), added new friend(s), last updated 9/7/2006

Elton
updated his profile, last updated 9/7/2006

Giants Fan Club
added new member(s), last updated 9/7/2006

CUSTOMIZING TRACKING CHANGES TO USER CONTENT IN AN ONLINE SOCIAL NETWORK

RELATED APPLICATIONS

This application is a continuation of U.S. application Ser. No. 13/269,307, filed Oct. 7, 2011, entitled, "Customizing Tracking Changes to User Content in an Online Social Network," which is a continuation of U.S. application Ser. No. 11/624,088, filed Jan. 17, 2007, entitled "Feeding Updates to Landing Pages of Users of an Online Social Network from External Sources", which is a continuation-in-part of U.S. application Ser. No. 11/531,154, filed Sep. 12, 2006, entitled "Method and System for Tracking Changes to User Content in an Online Social Network".

BACKGROUND

Particular embodiments generally relates to processing of online social network data.

Over the past several years, the amount of personal information that individuals share online has increased dramatically. Many web sites provide an online community that provides content focusing on a common interest or theme, and allows people to join the online community and share personal information with other users of the online community. Online social networking sites have also been rapidly gaining in popularity. Typically, users of an online social network communicate with one another and meet other users based on personal information captured in the profiles or landing pages of other users.

Also, users of online social networks often request their existing friends to join, creating a web of online relationships that mirror offline ones. Operators of online social networking sites typically require that new users provide certain personal information to join, including contact information (e.g., physical and e-mail addresses, telephone numbers, instant messaging nicknames, etc.) and identifying information (e.g. a name, location, personal interests, age, etc.).

A positive consequence of this general trend is the greater ability for groups of friends, families and other acquaintances to communicate online with, and about, each other as users of a social network. For example, a group of friends may share personal information with each other about common interests, individual personal attributes, events, schedules and activity plans and may also access each others' personal information. Another benefit of online social networks is that their users can more easily find others who share common interests, goals, lifestyles, etc., without being limited to an online community dedicated to a particular interest. Doing so allows members to expand their social networks.

With access to cheap storage and higher bandwidths, the amount of information stored by users of online social networks has grown exponentially. In addition to profile information, the users now often store large amounts of multimedia files, including blogs, digital photos, and digital audio and video files. As a consequence, the process of browsing the content of other users has become highly inefficient.

In addition, as more and more interesting web sites and online communities are being created, individuals are joining multiple ones to benefit from the services provided by them. The downside of all this is that individuals maintain their content under multiple profiles and it is becoming increasingly difficult to share them efficiently with others.

The web site, onxiam, permits a user to consolidate all of his or her online identities in a single location and present them as hyperlinks on a web page that can be made accessible to anyone who wants to learn about the user's multiple online identities. In Yahoo! 360°, users maintain a personal web site through which they can maintain a blog, share their photos using a feed from Flickr, present profile information, subscribe to external feeds, and see which friends are currently online.

Particular embodiments provide a method and system for feeding updates to landing pages of users in an online social network from external sources, so that the efficiency of finding and viewing content associated with users is much improved. According to particular embodiments, updates that a user of an online social network makes at another web site are automatically reflected on the user's landing page maintained by the online social network. Even though the user maintains a blog at another web site, stores photos at still another web site, and uploads videos on yet another web site, updates that the user makes at any of these web sites will automatically be reflected on the user's landing page. In addition, when an update event occurs, other users of the online social network are notified according to various criteria that they have set.

A method according to a first embodiment includes the steps of receiving updates to a landing page of a first user, notifying a second user of the updates, receiving a request for the landing page of the first user from the second user, generating a landing page of the first user, and transmitting the landing page to the second user for display. In the above recited method, the first user's landing page includes content that is retrieved from a local database and content that is supplied from an external database. The content may be a blog, a photo collection, or a video collection.

A method according to a second embodiment includes the steps of receiving a web page that indicates updates to a landing page of a first user, issuing a request for the landing page of the first user in response to a second user's input, receiving the landing page of the first user, and displaying the landing page of the first user to the second user. In the above recited method, the first user's landing page is managed by a web site for an online social network and includes content that is retrieved from a database that is maintained by this web site and content that is supplied from a different web site. The content may be a blog, a photo collection, or a video collection.

A server computer according to an embodiment includes a user database that maintains a landing page for a first user and tracking preferences of a second user, and a processing unit that is programmed to carry out the steps of (i) receiving and storing updates to the landing page of the first user including updates from a client computer of the first user and updates from an external computer, and (ii) if any of the updates is of a type included in the tracking preferences of the second user, notifying the second user of the updates.

The advantages of the method and system according to embodiments are several. First, a person who wants to learn about the user and his or her interests is able to access such information at a central location, i.e., the user's landing page. The person need not serially access the different web sites that contain the user's content. Second, a friend of the user need not constantly browse through the content the user is maintaining at the different web sites to see if such content has been updated. Third, a person can define a filter for the content updates by selecting the users that he or she would like to track and the type of content updates that he or she is interested in tracking. Fourth, a person can select different ways of being notified of the content updates as well as the frequency of the notifications.

BRIEF DESCRIPTION OF THE DRAWINGS

So that the manner in which the above recited features of particular embodiments can be understood in detail, a more particular description of particular embodiments, briefly summarized above, may be had by reference to embodiments, some of which are illustrated in the appended drawings. It is to be noted, however, that the appended drawings illustrate only particular embodiments and are therefore not to be considered limiting of its scope, for the disclosure may admit to other equally effective embodiments.

FIG. 4A is a schematic illustration of a web page used to specify various notification settings;

DETAILED DESCRIPTION

Figure 1:
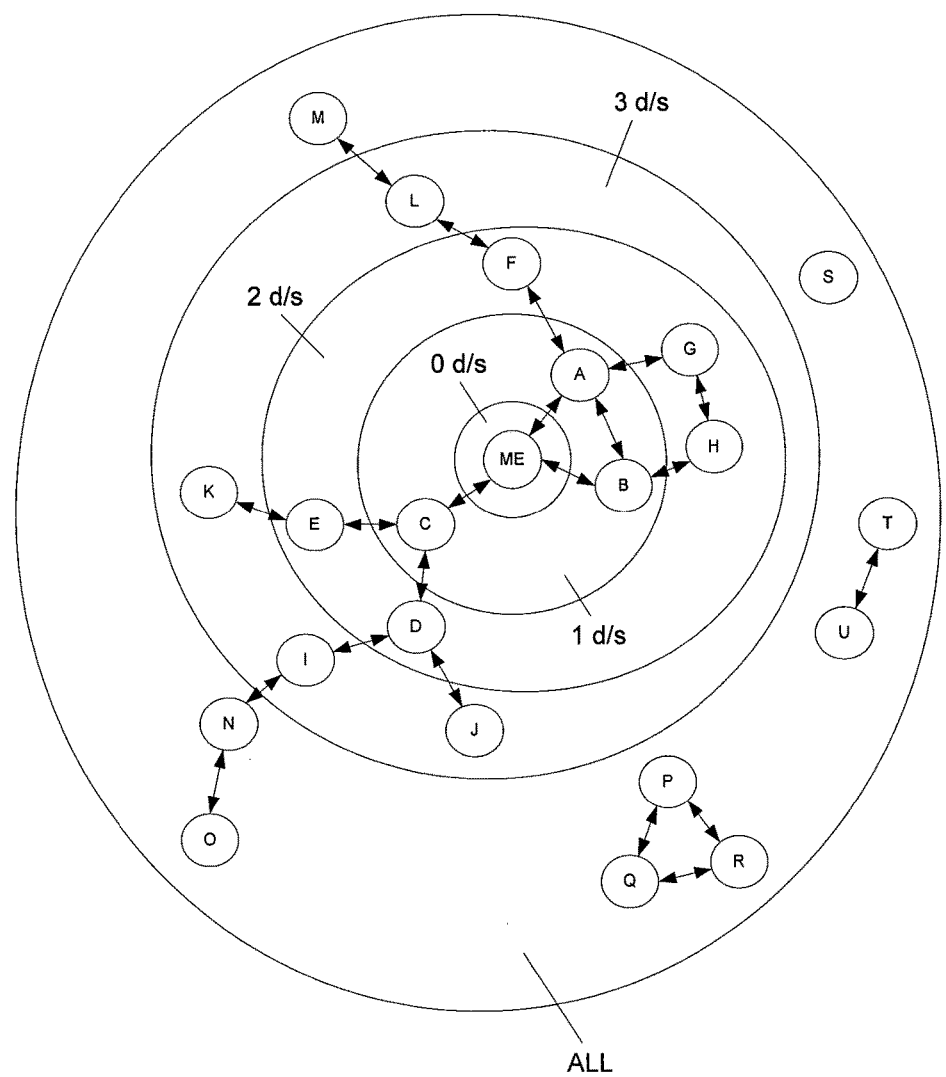
FIG. 1 is a diagram that graphically represents the relationships between users of an online social network.

FIG. 1 is a graph representation of a social network centered on a given individual (ME). Other users of this social network include A-U whose position, relative to ME's, is referred to by the degree of separation between ME and each other user. Friends of ME, which includes A, B, and C, are separated from ME by one degree of separation (1 d/s). A friend of a friend of ME is separated from ME by 2 d/s. As shown, D, E, F, G, and H are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
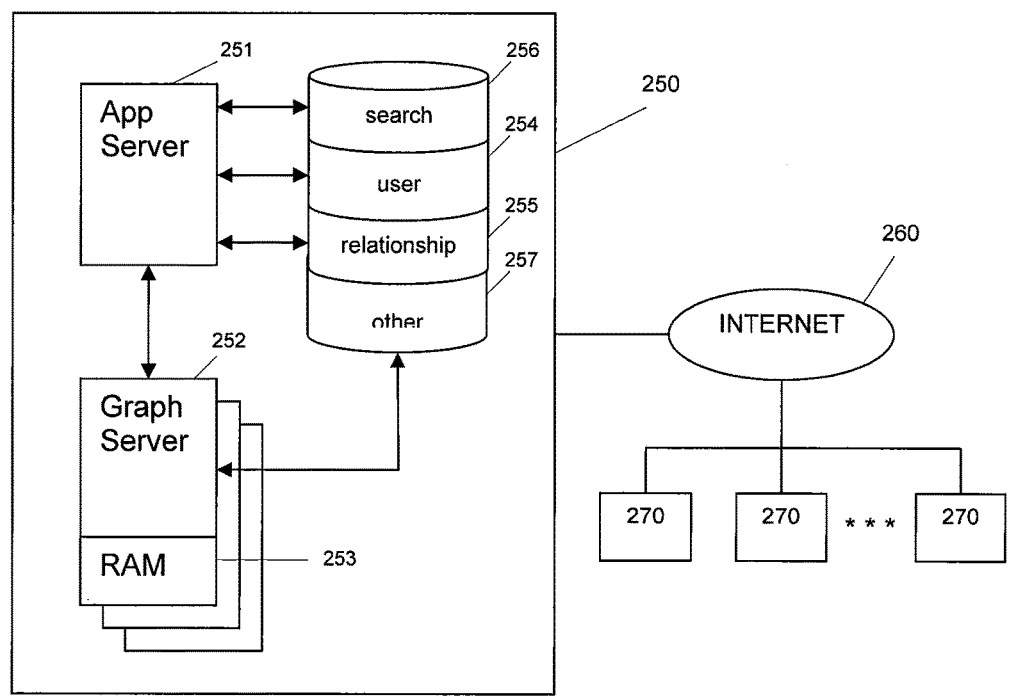
FIG. 2 is a block diagram illustrating components of a system for managing an online social network.

FIG. 2 is a block diagram illustrating a system 250 for creating and managing an online social network. The system 250 represents one example embodiment of a system for creating and managing an online social network, and includes an application server 251 and one or more graph servers 252. As known in the art, a server is a computer having a processing unit and system memory that is programmed to carry out certain functions. The system 250 is connected to a network 260, e.g., the Internet, and accessible over the network by a plurality of remote computers (only three of which are shown), collectively designated as 270.

The application server 251 manages a user database 254, a relationship database 255, a search database 256, and other databases 257. The user database 254 contains profile information for each of the user in the online social network managed by the system 250. The profile information may include, among other things: a unique user identifier (user ID), name, age, gender, location, hometown, references to image files, listing of interests, attributes, and the like. The user database 254 also contains information about groups (e.g., organizations, school alumni associations, family, etc.) that users have defined. The group information may include, among other things: a unique group identifier (group ID), name, description of the group, and members of the group. The relationship database 255 stores for each user, the user IDs of all users with whom the user has a direct relationship, i.e., direct friends of the user who are users of the online social network. In addition, the contents of the user database 254 are indexed and optimized for search, and stored in the search database 256. The other databases 257 may include a database for storing testimonials, and various other information commonly stored in online social networks and communities. The user database 254, the relationship database 255, the search database 256, and the other databases 257 are updated to reflect inputs of new user information and edits of existing user information that are made through the remote computers 270.

The application server 251 also manages the information exchange requests that it receives from the remote computers 270. The graph servers 252 receive a query from the application server 251, process the query and return the query results to the application server 251. The graph servers 252 manage a representation of the social network for all users in the member database. The graph servers 252 have a dedicated memory device 253, such as a random access memory (RAM), in which an adjacency list that indicates all first degree relationships in the social network is stored. The graph servers 252 respond to requests from application server 251 to identify relationships and the degree of separation between users of the online social network.

In the embodiments described below, users are respectively operating the remote computers 270 that are programmed to execute web browser programs, and access the web pages managed by the application server 251 using the web browser programs. The web pages that are displayed to a user are transmitted from the application server 251 to that user's remote computer and processed by the web browser program stored in that user's remote computer for display through the monitor of that user's remote computer.

Figure 3:
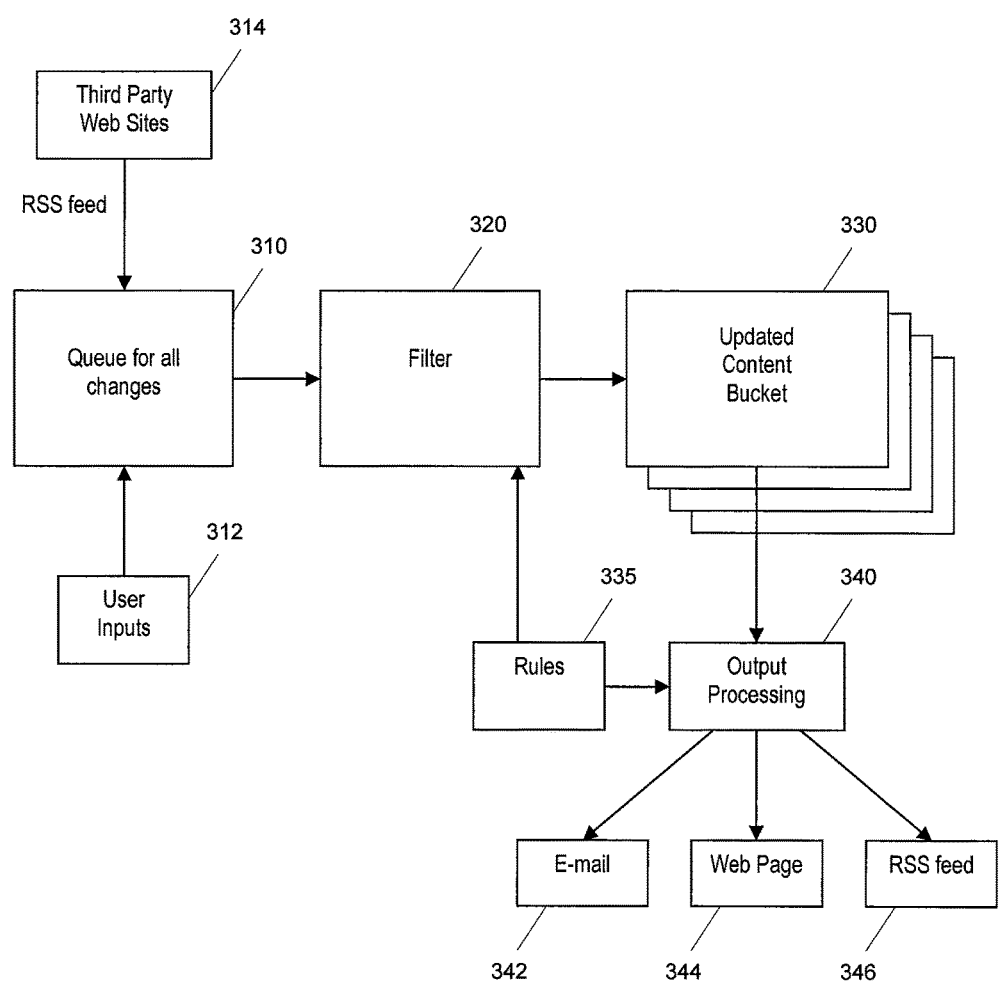
FIG. 3 schematically illustrates the process for tracking changes and updates to content in an online social network and managing the notification of such changes and updates.

FIG. 3 schematically illustrates the process for tracking changes and updates to content in an online social network and managing the notification of such changes and. Blocks 310, 320, 330, 335, 340 represent the operations that are being carried out by the application server 251. Block 312 represents the user inputs that are made through a browser running on a remote computer and are transmitted over the Internet to the application server 251. Block 314 represents certain inputs that are made at third party web sites 314, such as flickr, YouTube, xanga.com, and eBay, and transmitted over the Internet to the application server 251 using an RSS feed. All such inputs are aggregated and stored in a queue 310 that is managed by the application server 251.

The items stored in the queue 310 then undergo a filter process 320 one at a time on a first-in, first-out basis. The filter process 320 examines the items in the queue 310 and supplies them to updated content buckets 330, which represents a series of memory regions that have been allocated to the users of the online social network. The filter process 320 selectively supplies the items in the queue 310 to the updated content buckets 330 in accordance with rules 335 that have been defined for the users. For example, the filter process 320 selectively supplies the items in the queue 310 to the updated content bucket 330 of user A in accordance with rules 335 that have been defined for user A; the filter process 320 selectively supplies the items in the queue 310 to the updated content bucket 330 of user B in accordance with rules 335 that have been defined for user B; and so forth. For each user, the rules 335 include an identification of those users or groups whose content he or she desires to track and specify the type of content updates or changes that he or she desires to track. By applying these rules to the filter process 320, the items stored in the queue 310 are stored in an updated content bucket 330 of a user only if such items represent content updates or changes of another user or group that he or she desires to track and are of the type that he or she desires to track.

The items stored in the updated content buckets 330 undergo output processing 340. The output processing 340 is carried out separately for each of the different updated content buckets 330 and in accordance with the rules 335 defined by the user who is associated with the updated content bucket. For each user, the rules 335 specify the frequency of the output processing 340, and the method of notification, whether by e-mail 342, a web page 344, or an RSS feed 346.

FIG. 4A is a schematic illustration of a web page used to specify notification settings that define the rules 335. In section 410, the user selects the type of content updates or changes he or she desires to track. In section 420, the user specifies those other users or groups whose content he or she desires to track. In section 430, the user selects the method of notification. In section 440, the user selects the frequency of notification. In section 450, the user has the option of turning off all notifications. Certain selections on the web page require the user to supply additional information through the "specify" hyperlink. For example, the user selects from a list of friends, users, bookmarked profiles, or groups in section 420 if one of these options is checked. In certain embodiments, the user is given the option to select all friends who are within 1, 2, or 3 degrees of separation. Also, if the user selects the RSS feed option in section 430, the user is asked to specify the URL to which the RSS feed will be transmitted and user ID and password that are required to access such URL.

Figure 4B:
FIG. 4B is a schematic illustration of a web page used to communicate changes and updates to user content.
Figure 4B:
Figure 4B:
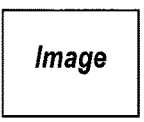
Figure 4B:

FIG. 4B is a schematic illustration of a web page used to communicate to a user of the changes and updates to content of other users of the online social network. This web page is displayed when the user accesses his or her homepage of the online social network. This means that the user has selected at least the "Home page" option in section 430 of FIG. 4A. If the user has also selected the "E-mail" option and the "RSS feed" option, the user will be notified of the updates noted below by those methods as well. The first entry indicates that the user, Tammy, added new friends. The second entry indicates that the user, Sarah, received new testimonials. The third entry indicates that the user, Elton, updated his profile. The fourth entry indicates that the group, Giants Fan Club, added new members. These entries indicate that the user has selected at least the first, third, and fourth options in section 410. They also indicate that the user is tracking the updates of at least Tammy, Sarah, Elton, and the Giants Fan Club. For simplicity, the user is notified of a fixed number of most recent content updates (in this example, 4). The user can view more updates by accessing the hyperlink, "More Friend Updates."

Figure 5:
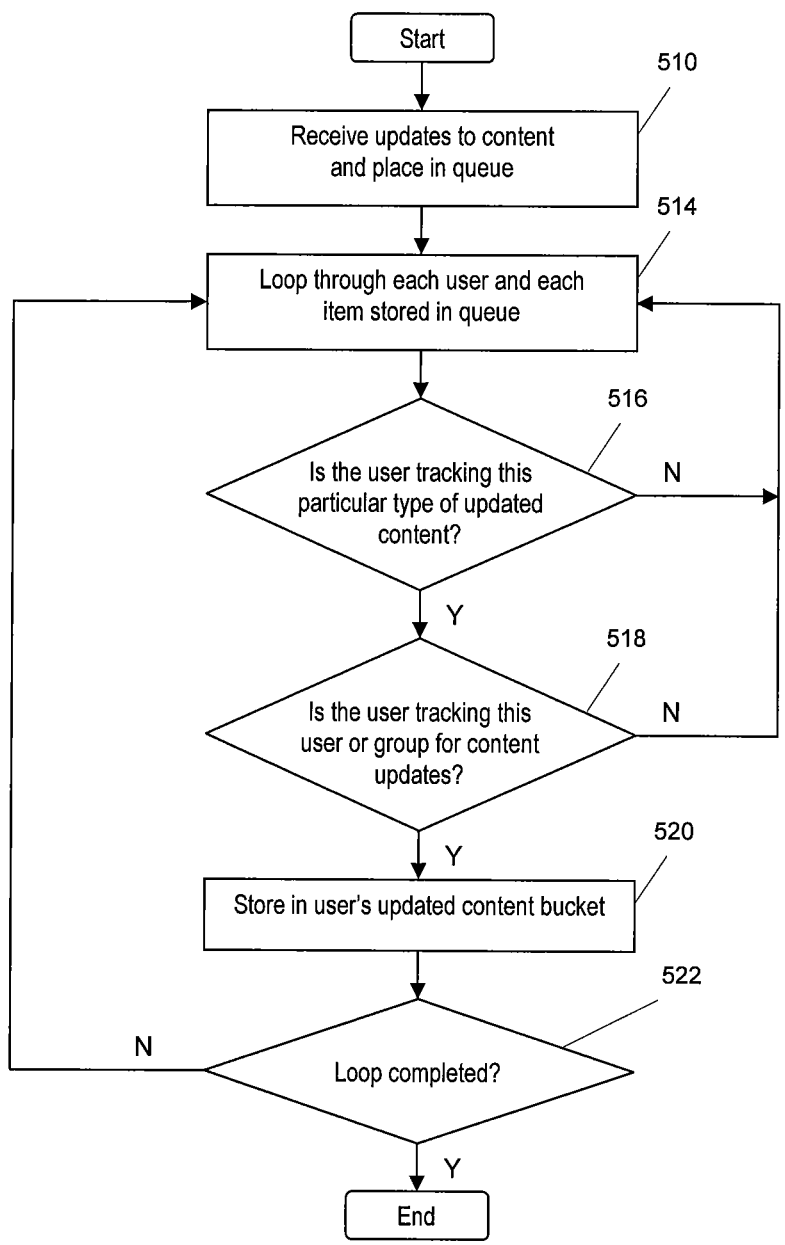
FIG. 5 is a flow diagram illustrating the process steps for filtering the changes and updates to user content.

FIG. 5 is a flow diagram illustrating the process steps for filtering changes and updates to content in an online social network. These process steps are carried out by the application server 251 as it is carrying out the operations represented by blocks 310, 320 shown in FIG. 3, and represents one illustrative way of how changes and updates to content can be processed so that applicable users can be notified of such changes and updates.

In step 510, user inputs that reflect updates and changes to content are received and stored in a queue. The items stored in the queue are then processed one at a time and per user in accordance with steps 514-522. Step 514 represents the beginning of the loop. In this step, an item stored in the queue and a user are selected for processing. Each time through the loop, a next user is selected. If all users have been selected, then the first user and a next item stored in the queue are selected for processing.

In step 516, the selected user's rules are examined to see if the queue item being processed is of the type that the user is tracking. If it is, the process continues to step 518. If not, the process returns to the beginning of the loop. In step 518, the selected user's rules are examined to see if the queue item being processed is an update made by a user or group that the selected user is tracking. If it is, the process continues to step 520. If not, the process returns to the beginning of the loop. In step 520, the item being processed is stored in the selected user's updated content bucket. Step 522 checks to see if all items in the queue have been processed for all users. If this condition is true, the process ends. If not, the process returns to the beginning of the loop.

Figure 6:
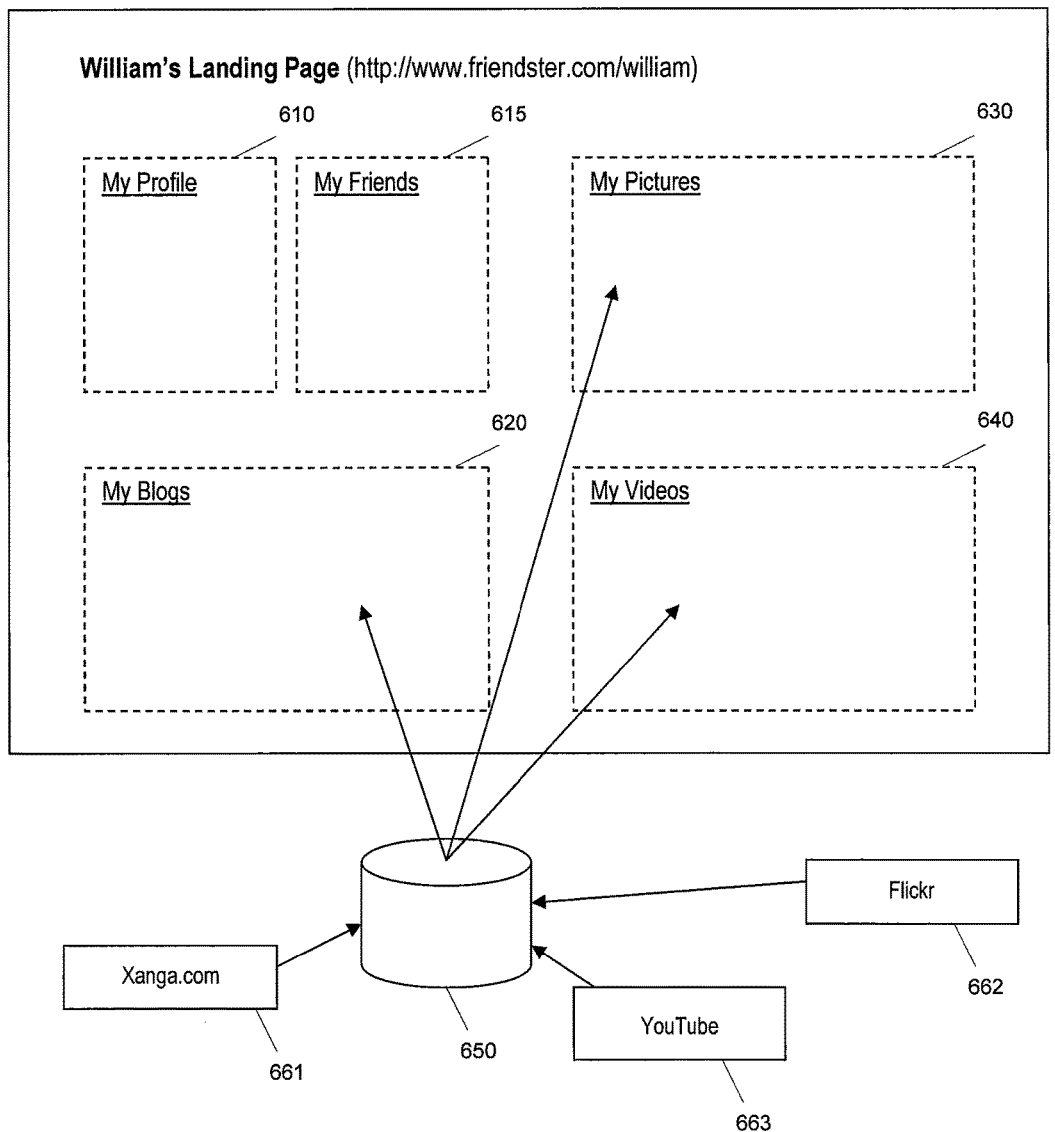
FIG. 6 is a schematic illustration of a landing page for a particular user and external content sources for the landing page.

FIG. 6 schematically illustrates a web page that functions as a landing page for a particular user in an online social network and external content sources for the landing page. This landing page can be accessed several ways. First, it can be accessed from within the online social network by the user when the user logs into the online social network and navigates to this web page or by other users who clicks on a user ID or an image associated with this user, e.g., from a Friend Tracker page shown in FIG. 4B. Second, it can be accessed directly by typing in the associated URL into a web browser. Third, this page may be opened up to web crawlers of search engines and accessed when a user clicks on a search result that is hyperlinked to this page.

The web page shown in FIG. 6 includes multiple sections that contain different categories of content associated with the user. The user's profile information is provided in section 610. A list of the user's friends in the online social network and hyperlinks to their landing pages are provided in section 615. Section 620 displays the user's blog. In this example, the user is maintaining a blog at an external web site 661, e.g., Xanga.com, and the content of his or her blog is supplied from the external web site using an RSS feed. In a similar manner, the content of the user's pictures that is displayed in section 630 is supplied from an external web site 662 (e.g., Flickr) using an RSS feed, and the content of the user's videos that is displayed in section 640 is supplied from an external web site 663 (e.g., YouTube) using an RSS feed.

As a way to minimize the number of times an external web site is accessed for the necessary RSS feeds, all RSS feeds from external web sites are stored in a cache storage unit 650. All RSS feeds are also assigned a minimum lifetime and a maximum lifetime. When a landing page of a user is accessed and the landing page contains sections that rely on RSS feeds, the lifetime of each such RSS feed is checked. If it is below its minimum lifetime, the last cached version of the RSS feed is accessed. If it has exceeded the minimum lifetime, a query is issued to the external web site for the latest information. On a global basis, whenever an RSS feed reaches its maximum lifetime, a query is issued to the external web site for the latest information.

The query that is issued to an external web site for content associated with a user includes the user ID and password of that user as proof that access to the user's account maintained by the external web site is authorized. The user ID and password are provided by the user when the user sets up his or her landing page to retrieve content from external web sites through RSS feeds. The issued query is kept hidden at the user level and preferably encoded or encrypted so that the user ID and password contained in the query can be kept confidential.

Figure 7:
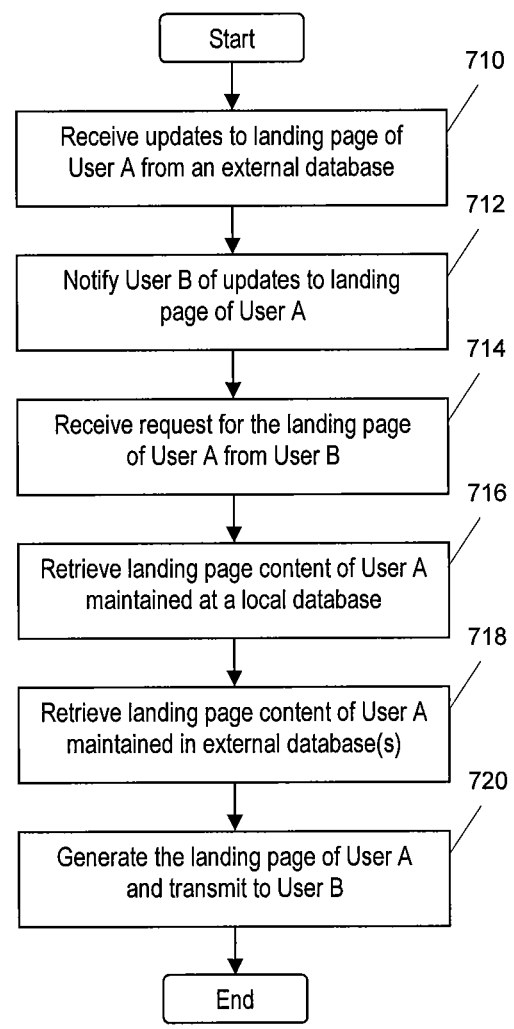
FIG. 7 is a flow diagram illustrating the process steps carried out by a server computer for an online social network when notifying users of updates to landing pages and generating the landing pages upon request.

FIG. 7 is a flow diagram illustrating the process steps carried out by a server computer for an online social network when notifying users of updates to landing pages and generating the landing pages upon request. More specifically, FIG. 7 illustrates the process where the landing page of one user (User A) is updated and the update notice and the updated landing page are transmitted to another user (User B). In step 710, the server computer receives updates to the landing page of User A from an external database. Each of the updates is associated with a particular RSS feed and is received in response to a query issued by the server computer to the external database for that update. When the updates are returned, they are stored in a cache storage unit. For each RSS feed, the external database is queried for a new update when: (1) [X] seconds has elapsed since the last update; or (2) the landing page of User A is accessed and [y] seconds has elapsed since the last update. The received updates are placed in the queue 310 (shown in FIG. 3) and processed in the manner described above in conjunction with FIG. 3.

When the landing page of User A contains updates, User B is notified of one or more of these updates under certain conditions, e.g., the update is of the content type that User B desires to track and User A is part of a group of users that User B desires to track (step 712). User B is notified using a web page similar to the one that is schematically illustrated in FIG. 4B. A selection of any user on the notification page is interpreted as the server computer as a request for the landing page of that user (step 714). In response to this request, the server computer retrieves the content for User A's landing page that is stored locally in one of the databases managed by the server computer (step 716) and the content for User A's landing page that is maintained in one of the external databases (step 718). The content for User A's landing page that is maintained in one of the external databases is retrieved from the cache storage unit. Prior to the retrieval, a query may be issued to the external databases for a new update depending on how much time has elapsed since the most recent update for that content was stored in the cache storage unit. If more than [Y] seconds has elapsed since the last update, the query for new updates is issued to the external databases. When the new update is received, the content associated with the new updates is modified accordingly. In step 720, the landing page of User A is generated using the content retrieved in steps 716 and 718 and transmitted to User B.

Figure 8:
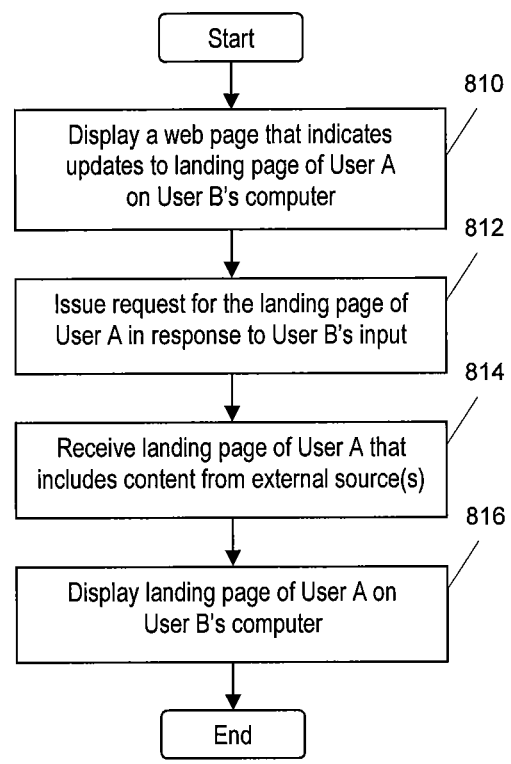
FIG. 8 is a flow diagram illustrating the process steps carried out by a client computer connected to a server computer for an online social network when notifying a user of updates to a landing page of another user and displaying the landing page to the user.

FIG. 8 is a flow diagram illustrating the process steps carried out by a client computer connected to a server computer for an online social network when notifying a user of updates to a landing page of another user and displaying the landing page to the user. More specifically, FIG. 8 illustrates the process where updates to the landing page of one user (User A) are displayed on the client computer of another user (User B), and User B selects the landing page of User A that includes content from external sources for display. In step 810, the client computer displays a web page that indicates updates to the landing page of User A. This web page is similar to the one that is schematically illustrated in FIG. 4B. User B then clicks on the hyperlink associated with User A from this web page, and in response, the client computer issues a request for the landing page of User A to the server computer for the online social network (step 812). Then, in step 814, the client computer receives the landing page of User A that includes content managed by the server computer as well as content managed by another server computer. In step 816, the landing page of User A received in step 814 is displayed to User B.

In the embodiments described above, RSS feeds are described as the mechanism for feeding content from the server computers of third party web sites to the server computer of the online social network. Other types of web feeds may be employed in particular embodiments. Some of these examples include atom feeds and feeds based on the SOAP protocol. It may even be possible to crawl the web pages of the third party web sites to collect the relevant information and store any updates in the cache storage unit.

While particular embodiments have been illustrated and described above, those skilled in the art understand that other embodiments can take a variety of forms and embodiments within the scope of the appended claims.

What is claimed is:

1. A method comprising, by one or more processors associated with one or more computer systems of an online social network:

transmitting, from an application server of the online social network, a query to a third-party external server for a content update made on the external server by a first user of the online social network, wherein the online social network comprises a graph data structure comprising a plurality of nodes and connections between the nodes, each of one or more of the nodes being associated with one of a plurality of users of the online social network, the first user being associated with a first node of the plurality of nodes, each connection between two nodes representing a relationship between them and establishing a single degree of separation between them, and wherein the third-party external server is separate from and external to the one or more computing systems of the online social network;

receiving, at the application server from the third-party external server in response to the query, the content update made on the third-party external server by the first user;

identifying, by the application server, an update type of the content update made on the third-party external server, the update type identifying a type of content update that occurs on the third-party external server and is associated with the first user;

generating, by the application server, an update notification for the content update made on the third-party external server, the update notification comprising an indication of the update type and an indication that content on the third-party external server associated with the first user has been updated or changed on the third-party external server; and transmitting, from the application server to one or more client system of one or more second users of the online social network via one or more services, the update notification for the content update made on the third-party external server, the one or more second users each being associated with one or more second nodes of the plurality of nodes, respectively, each of the second nodes being separated in the graph data structure from the first node within a predetermined number of degrees of separation, wherein the predetermined number of degrees of separation represent a predetermined number of connections between nodes in the graph data structure.

2. The method of claim 1, the query comprising a user ID and a password.

3. The method of claim 1, wherein the transmission of the query occurs periodically at predetermined intervals.

4. The method of claim 1, the one or more services comprising a friend tracker web page generator.

5. The method of claim 4, wherein the friend tracker web page generator generates one or more web pages including the update notification.

6. The method of claim 1, wherein the update notification is in a web feed format, and wherein the one or more services syndicates the update notification to a web feed.

7. The method of claim 6, wherein the web feed format is really simple syndication (RSS).

8. The method of claim 1, wherein a web feed reader transmits the query and receives the content update.

9. The method of claim 8, wherein the web feed reader is an RSS reader or aggregator, and the content update is delivered in RSS format.

10. The method of claim 8, wherein the web feed reader is a web widget.

11. The method of claim 10, further comprising:
receiving a request for a landing page associated with the first user;
generating the landing page associated with the first user, the landing page including the web widget; and
transmitting the landing page to the source from which the request was received.

12. The method of claim 11, wherein the inclusion, placement, and appearance of the web widget are based on a user profile associated with the first user.

13. The method of claim 1, further comprising:
initiating a timer substantially simultaneously with transmitting the query;
storing the received content update in a cache; and
re-transmitting the query upon the timer reaching a predetermined value.

14. The method of claim 1, further comprising:
initiating a timer substantially simultaneously with transmitting the query;
storing the received content update in a cache;
receiving a request for a landing page associated with the first user;
determining that the timer exceeds a predetermined value;
retransmitting the query; and
updating the requested landing page with a second content update received in response to the retransmitted query.

15. A non-transitory, computer-readable media comprising instruction operable, when executed by one or more computing systems of an online social network, to:

transmit, from an application server of the online social network, a query to a third-party external server for a content update made on the external server by a first user of the online social network, wherein the online social network comprises a graph data structure comprising a plurality of nodes and connections between the nodes, each of one or more of the nodes being associated with one of a plurality of users of the online social network, the first user being associated with a first node of the plurality of nodes, each connection between two nodes representing a relationship between them and establishing a single degree of separation between them, and wherein the third-party external server is separate from and external to the one or more computing systems of the online social network;

receive, at the application server from the third-party external server in response to the query, the content update made on the third-party external server by the first user;

identify, by the application server, an update type of the content update made on the third-party external server, the update type identifying a type of content update that occurs on the third-party external server and is associated with the first user;

generate, by the application server, an update notification for the content update made on the third-party external server, the update notification comprising an indication of the update type and an indication that content on the third-party external server associated with the first user has been updated or changed on the third-party external server; and transmit, from the application server to one or more client system of one or more second users of the online social network via one or more services, the update notification for the content update made on the third-party external server, the one or more second users each being associated with one or more second nodes of the plurality of nodes, respectively, each of the second nodes being separated in the graph data structure from the first node within a predetermined number of degrees of separation, wherein the predetermined number of degrees of separation represent a predetermined number of connections between nodes in the graph data structure.

16. An apparatus comprising: a communication interface; one or more processors; and one or more non-transitory, computer-readable media comprising instruction operable, when executed by one or more processors associated with one or more computing systems of an online social network, to:

transmit, from an application server of the online social network, a query to a third-party external server for a content update made on the external server by a first user of the online social network, wherein the online social network comprises a graph data structure comprising a plurality of nodes and connections between the nodes, each of one or more of the nodes being associated with one of a plurality of users of the online social network, the first user being associated with a first node of the plurality of nodes, each connection between two nodes representing a relationship between them and establishing a single degree of separation between them, and wherein the third-party external server is separate from and external to the one or more computing systems of the online social network;

receive, at the application server from the third-party external server in response to the query, the content update made on the third-party external server by the first user;

identify, by the application server, an update type of the content update made on the third-party external server, the update type identifying a type of content update that occurs on the third-party external server and is associated with the first user;

generate, by the application server, an update notification for the content update made on the third-party external server, the update notification comprising an indication of the update type and an indication that content on the third-party external server associated with the first user has been updated or changed on the third-party external server; and transmit, from the application server to one or more client system of one or more second users of the online social network via one or more services, the update notification for the content update made on the third-party external server, the one or more second users each being associated with one or more second nodes of the plurality of nodes, respectively, each of the second nodes being separated in the graph data structure from the first node within a predetermined number of degrees of separation, wherein the predetermined number of degrees of separation represent a predetermined number of connections between nodes in the graph data structure.

17. The method of claim 1, wherein the predetermined number of degrees of separation is one, two, three, or any.

18. The method of claim 1, wherein the predetermined number of degrees of separation is specified by the first user.

19. The method of claim 1, wherein the content update is one or more of:
    an added or updated photo and the external server is a server of a photograph-sharing web site;
    an added or updated video and the external server is a server of a video-sharing web site; or
    an added or updated blog or blog post and the external server is a server of a blogging web site.

* * * * *